United States Patent [19]
Hughes et al.

[11] 3,913,011
[45] Oct. 14, 1975

[54] METHOD AND APPARATUS FOR MEASURING CONVERSION OF AMPLITUDE MODULATION TO PHASE MODULATION

[75] Inventors: Leon Hughes, San Mateo, Calif.; Michael Crabtree, Linlithgow, Great Britain

[73] Assignee: Hewlett-Packard Limited, South Queensferry, Scotland

[22] Filed: Mar. 29, 1974

[21] Appl. No.: 456,095

[30]    Foreign Application Priority Data
   Apr. 4, 1975    United Kingdom............... 16060/73

[52] U.S. Cl.............................................. 324/57 R
[51] Int. Cl.² ........................................ G01R 27/00
[58] Field of Search ................................ 324/57 R

[56]         References Cited
         UNITED STATES PATENTS
2,416,310   2/1947   Hansen et al. ................. 324/57 R X
3,787,763   1/1974   Coackley .......................... 324/57 R Primary Examiner—Stanley T. Krawczewicz
Attorney, Agent, or Firm—Theodore S. Park

[57]             ABSTRACT

This method and apparatus measures conversion of amplitude modulation to phase modulation and is useful for any application wherein resultant unwanted phase modulation is to be measured, but is mainly intended for testing devices used in frequency modulated multichannel communication systems having amplitude modulation to phase modulation conversion which causes distortion of a desired frequency modulated signal.

11 Claims, 2 Drawing Figures

METHOD AND APPARATUS FOR MEASURING CONVERSION OF AMPLITUDE MODULATION TO PHASE MODULATION

BACKGROUND OF THE INVENTION

Typically the problem of measuring amplitude modulation to phase modulation conversion of devices such as limiters and travelling wave tubes have been solved by either "static" or "dynamic" methods.

In the static method the amplitude level of an AC test signal with fixed frequency is changed and the change in phase of the output is observed. The amplitude modulation to phase modulation conversion is dependent on the frequency of the amplitude modulation and hence, this method has the disadvantage of not simulating the true operating conditions where the amplitude modulation is occurring at a high frequency. Such a method is described by F. Carasse, under the title, "Research on Radio Relay Systems Having a Very High Transmission Capacity"in Alta Frequenza, February 1962 at page 82.

In the dynamic methods an amplitude modulating signal is applied to a carrier. After passing through the item under test the spectrum of the signal is observed. The frequency modulation at the same rate as the amplitude modulation is now applied to the carrier and the amplitude of the frequency modulation required to cancel the phase modulation introduced by the item under test gives a measure of the amplitude modulation to phase modulation conversion. This method has the disadvantage that a spectrum analyzer is required, adjustment of both the amplitude and phase of the frequency modulation is required and considerable time is required to make measurement of a single carrier frequency. Such a method is described by T. Sarkany, under the title "A New Method for Measuring Amplitude to Phase Modulation Conversion and Amplitude Modulation Compression" in Proc. IEEE, Part B, March 1962, page 151; Radiotechnica/Moscow, August 1964.

A second dynamic method is to amplitude modulate the signal and detect any phase modulation introduced using a frequency discriminator. This method has the disadvantage that the sensitivity of the discriminator must be accurately known and also that it should be able to measure the very low level of the signal produced by the amplitude modulation to phase modulation converter.

SUMMARY OF THE INVENTION

According to the present invention there is provided a method and apparatus for measuring the conversion of amplitude modulation to phase modulation caused by a device under test wherein a carrier frequency is amplitude modulated and frequency or phase modulated at different input modulating frequencies to form a composite test signal. The composite test signal is passed through the device under test and to a frequency to voltage converter at the receiving end of the device under test, said converter giving an output voltage with basically two components each having a frequency which corresponds to the input modulating frequencies. Amplitude variation or phase variation of said composite converter output signal is measured as a value indicative of the amplitude modulation to phase modulation conversion.

DESCRIPTION OF THE PREFERRED EMBODIMENT

Figure 1:
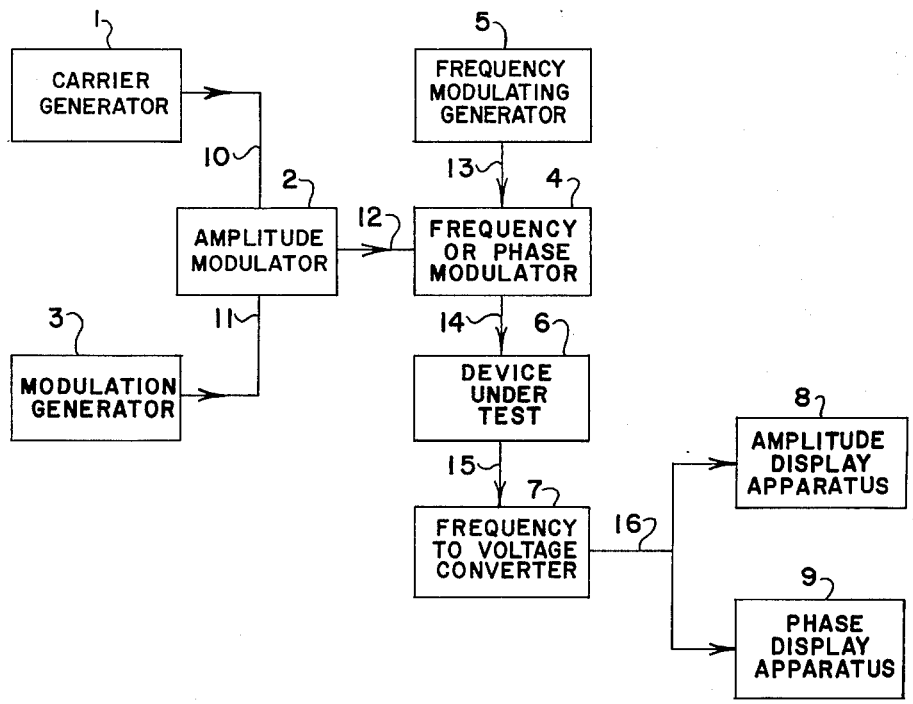
FIG. 1 is a schematic block diagram of a preferred embodiment of an amplitude modulation to phase modulation measurement apparatus.

A high quality amplitude modulator 2 is connected to receive a carrier frequency 10 from a carrier generator 1 and an amplitude modulating signal 11 from a modulation generator 3. The output of amplitude modulator 2 is connected as an input to a frequency modulator 4. Frequency modulator 4 is also connected to receive a modulating signal 13 from a frequency modulating generator 5. The amplitude modulating signal 12 and frequency modulating signal 13 have different frequencies. The output of the frequency modulator 4 is applied as an input to a device under test 6. The output of the device under test 15 is applied to a frequency to voltage converter 7. The frequency to voltage converter 7 produces a composite converter output signal 16 which is applied to an amplitude display apparatus 8 for measuring and displaying differential amplitude variation and/or a phase display apparatus 9 for measuring and displaying differential phase variation of composite converter output signal 16.

In operation the amplitude modulator 2 delivers a predetermined amplitude modulated carrier signal 12 to the frequency modulator 4. The frequency modulator 4 supplies a composite test signal 14 to the device under test which is frequency and amplitude modulated at different frequencies. The output signal from the device under test 15 is demodulated in the frequency to voltage converter 7. The composite converter output signal 16 of the converter 7 is a composite signal having a varying amplitude and can be thought to consist of two components. The frequency of one component corresponds to the input frequency modulating signal 13, while the frequency of the other component corresponds to the input amplitude modulating signal 11. The latter component is caused by the amplitude modulation to phase modulation, if any, of the device under test 6. The composite signal 16 can be supplied to the amplitude display apparatus 8 or phase display apparatus 9 in order to determine the amplitude or the phase variations of the composite signal.

Figure 2:
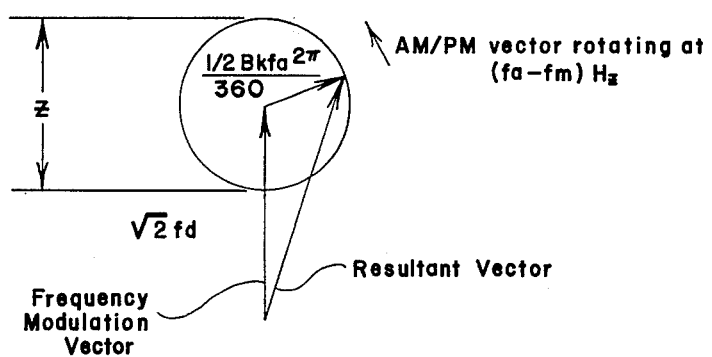
FIG. 2 is a vector diagram of the demodulated frequency obtained from a device under test at the output of the frequency to voltage converter used in the apparatus shown in FIG. 1.

Referring to the vector diagram of FIG. 2, it can be seen that the measurement of a value related to the amplitude or the phase of composite converter output signal 16 is indicative of the amplitude modulation to phase modulation conversion. The theory for the measurement will become clear from a study of the vector diagram of FIG. 2, and the following formulas using the abbreviations:

$fm$ (Hz): frequency modulating rate,
$fa$ (Hz): amplitude modulating rate,
$fd$ (Hz): RMS value of the frequency deviation of the frequency modulation,
$B$ (dB): modulation depth of the amplitude modulation,
$K°/dB$: amplitude modulation to phase modulation conversion of the item under test, $m = fd/fm$: modulation index of frequency modulation, $BK°$: peak to peak phase modulation of carrier due to amplitude modulation $$z = \frac{2\pi\, B\, K\, fa}{360} Hz$$

$$\frac{z}{\sqrt{2}\, fd} = \frac{200\pi\, B\, K\, fa}{360\, \sqrt{2}\, fd}\% \approx \frac{1.745}{m} B\, K\, \%$$

if $fm \approx fa$ peak to peak amplitude modulation of signal, or $$\frac{2\pi\, B\, K\, fa}{360\, \sqrt{2}\, fd} \text{radians} = \frac{1.745}{m} B\, K\, \% \text{ radians}$$

if $fm \approx fa$ peak to peak phase modulation of signal.

In FIG. 2 the vectors of the input frequency modulation and the phase or frequency modulation caused by the device under test are illustrated. The vectors of the frequency modulation caused by the device under test are illustrated. The vector of the frequency modulation caused by the device under test may be thought to rotate around the first vector with a beat frequency $fa - fm$. The amplitude of the vector of the frequency modulation is $\sqrt{2}\, fd$ while the amplitude of the amplitude modulation to phase modulation vector is $$\frac{1}{2} \cdot \frac{B\, K\, fa\, 2\pi}{360}.$$

The various components of the block diagram of FIG. 1 can take different forms and can be varied, for example: The carrier frequency can first be frequency modulated and then be amplitude modulated. It can be phase modulated instead of being frequency modulated. In case the device under test already provides a carrier frequency, of course, no additional carrier frequency generator is necessary. Furthermore, the frequency modulator 4 and the frequency modulating generator 5 can form a part of the transmitter of a standard measurement set for measuring differential gain, for example of applicant's Model 3710A. In this case, in addition to such a transmitter an amplitude modulator and a generator for supplying an amplitude modulating signal have to be provided.

At the receiving end, the frequency to voltage converter can take different forms. It should preferably have a limiter which is suitably dimensioned, such that the amplitude modulation at its input is substantially suppressed. Furthermore, there may be provided within the frequency to voltage converter either an amplitude detector or a phase detector, or both, each being configured to measure and display the variation of the converter output signal as indicative of the amplitude modulation to phase modulation conversion. These variations vary the beat frequency, i.e. the amount of the difference of the two input modulating frequencies.

The voltage to frequency converter, which terms include what usually is called a "discriminator," as well as the display apparatus could form part of a receiver of a differential gain and/or differential phase measurement set, for example applicant's Model No. 3702B.

A band pass filter could be provided at the discriminator output for obtaining the beat frequency component from the composite converter output. The amplitude variation of the beat frequency component could then be measured and would be indicative of the amplitude modulation to phase modulation conversion. The beat frequency amplitude variation could also be measured otherwise, for example by means of an oscilloscope.

We claim:

1. A method for measuring the conversion of amplitude modulation to phase modulation caused by a device under test comprising the steps of:

amplitude modulating and frequency modulating at first and second input modulating frequencies, respectively, a carrier frequency to form a composite test signal;

applying the composite test signal as an input to the device under test;

applying an output of the device under test to a frequency to voltage converter to produce a composite converter output signal having basically two components, a first component having a frequency corresponding to the first input modulating frequency and a second component corresponding to the second input modulating frequency; and measuring variation of the composite converter output signal with respect to the composite test signal as a value indicative of amplitude modulation to phase modulation conversion caused by the device under test.

2. A method as in claim 1 wherein the step of measuring variation of the composite converter output signal comprises the steps of:

obtaining the beat frequency component of the amplitude variation of the composite converter output signal; and measuring the amplitude of the beat frequency component as indicative of the amplitude modulation to phase modulation conversion.

3. A method as in claim 1 wherein the step of measuring variation of the composite converter output signal comprises the step of:

measuring the phase variation of the second component of the composite converter output signal with respect to the second input modulating frequency as indicative of the amplitude modulation to phase modulation conversion.

4. Apparatus for measuring the conversion of amplitude modulation to phase modulation caused by a device under test comprising:

a carrier generator producing a carrier frequency at a first frequency;

a modulation generator producing an amplitude modulating signal at a second frequency;

a frequency modulating generator producing a frequency modulating signal at a third frequency;

an amplitude modulator connected to receive the carrier frequency and the amplitude modulating signal for producing an amplitude modulated carrier signal;

a frequency modulator connected to receive the frequency modulating signal and the amplitude modulated carrier signal for producing a composite test signal;

means for applying the composite test signal as an input to the device under test;

a frequency to voltage converter coupled to the device under test to receive a device output for producing a converter output signal having two components, one component having a frequency corresponding to the third frequency and the other component having a frequency corresponding to the second frequency in response to the device output; and means connected to receive the converter output signal for producing a signal related to the amplitude variation of the composite converter output signal indicative of the amplitude modulation to phase modulation conversion.

5. Apparatus as claimed in claim 4, wherein means for producing a signal related to the amplitude variation of the composite converter output signal is a display apparatus.

6. Apparatus as claimed in claim 5, wherein the frequency to voltage converter and the display apparatus comprise a receiver within a differential gain measuring set.

7. Apparatus as claimed in claim 5, wherein the frequency modulating generator and the frequency modulator comprise a transmitter of a differential gain measuring test set.

8. Apparatus for measuring the conversion of amplitude modulation to phase modulation caused by a device having an input and an output under test comprising:
    a carrier generator producing a carrier frequency at a first frequency;
    a modulation generator producing an amplitude modulating signal at a second frequency;
    a frequency modulating generator producing a frequency modulating signal at a third frequency;
    an amplitude modulator connected to receive the carrier frequency and the amplitude modulating signal for producing an amplitude modulated carrier signal;
    a frequency modulator connected to receive the frequency modulating signal and the amplitude modulated carrier signal for producing a composite test signal;
    means for applying the composite test signal to the device input;
    a frequency to voltage converter having an input coupled to the device output and producing a converter output signal having two components, one component having a frequency corresponding to the third frequency and the other component having a frequency corresponding to the second frequency in response to the device output; and
    means connected to receive the converter output signal for producing a signal related to the phase variation of the composite converter output signal indicative of the amplitude modulation to phase modulation conversion.

9. Apparatus as claimed in claim 8, wherein means for producing a signal related to the phase variation of the composite converter output signal is a display apparatus.

10. Apparatus as claimed in claim 9, wherein the frequency to voltage converter as well as the display apparatus comprises a receiver of a differential phase measuring set.

11. Apparatus as claimed in claim 5, wherein the frequency modulating generator and the frequency comprise a transmitter of a differential phase measurement test set.

* * * * *